United States Patent [19]

Gladrow

[11] 4,292,169

[45] Sep. 29, 1981

[54] HYDROCARBON CONVERSION WITH ZEOLITE CATALYST IN METALS-ABSORBING MATRIX

[75] Inventor: Elroy M. Gladrow, Baton Rouge, La.

[73] Assignee: Exxon Research & Engineering Co., Florham Park, N.J.

[21] Appl. No.: 1,722

[22] Filed: Jan. 8, 1979

Related U.S. Application Data

[63] Continuation-in-part of Ser. No. 746,188, Nov. 30, 1976, abandoned, which is a continuation-in-part of Ser. No. 626,225, Oct. 28, 1975, abandoned.

[51] Int. Cl.³ .................... C10G 9/16; C10G 11/05
[52] U.S. Cl. .................... 208/120; 208/111; 208/135; 208/251 R; 252/477 R; 585/475
[58] Field of Search ............ 208/120, 121, 111, 135; 585/475

[56] References Cited

U.S. PATENT DOCUMENTS

| | | | |
|---|---|---|---|
| 3,276,993 | 10/1966 | Reid | 208/120 |
| 3,312,615 | 4/1967 | Cramer et al. | 208/120 |
| 3,324,047 | 6/1967 | Hansford | 252/455 |
| 3,365,392 | 1/1968 | Mitsche et al. | 208/138 |
| 3,376,214 | 4/1968 | Bertolacini et al. | 208/89 |
| 3,428,550 | 2/1969 | Erickson et al. | 208/120 |
| 3,464,929 | 9/1969 | Mitsche | 252/442 |
| 3,511,773 | 5/1970 | Addison et al. | 208/139 |
| 3,542,670 | 11/1970 | Erickson et al. | 208/120 |
| 3,558,476 | 1/1971 | Robbins et al. | 208/120 |
| 3,684,692 | 8/1972 | Keith et al. | 208/65 |
| 3,758,403 | 9/1973 | Rosinski et al. | 208/120 |
| 3,944,482 | 3/1976 | Mitchell et al. | 208/120 |
| 4,071,436 | 1/1978 | Blanton et al. | 208/120 |
| 4,141,859 | 2/1979 | Plank et al. | 208/139 X |
| 4,198,320 | 4/1980 | Chester et al. | 208/120 X |

*Primary Examiner*—Delbert E. Gantz
*Assistant Examiner*—G. E. Schmitkons
*Attorney, Agent, or Firm*—Marthe L. Gibbons

[57] ABSTRACT

A hydrocarbon conversion catalyst suitable for conversion of heavy hydrocarbon oils containing large amounts of metallic contaminants, such as petroleum residua, to lower boiling products comprises a porous inorganic oxide such as bulk alumina composited with an inorganic oxide gel matrix such as silica-alumina, and a crystalline aluminosilicate zeolite.

20 Claims, No Drawings

HYDROCARBON CONVERSION WITH ZEOLITE CATALYST IN METALS-ABSORBING MATRIX

CROSS REFERENCE TO RELATED APPLICATIONS

This application is a continuation-in-part of U.S. application Ser. No. 746,188 filed Nov. 30, 1976, which is a continuation-in-part of U.S. application Ser. No. 626,225 filed Oct. 28, 1975, both now abandoned, the teachings of which are hereby incorporated by specific reference. Other cases related to Ser. Nos. 746,188 and 626,225 are as follows: U.S. application Ser. No. 081,275 filed Oct. 1, 1979 is a divisional application of U.S. application Ser. No. 001,722 filed Jan. 8, 1979. U.S. application Ser. No. 862,175 filed Dec. 19, 1977, now U.S. Pat. No. 4,147,613, is a divisional of U.S. application Ser. No. 836,221, filed Sept. 21, 1977. U.S. application Ser. No. 836,221, now U.S. Pat. No. 4,151,119, is a continuation-in-part of now-abandoned U.S. application Ser. No. 746,188 filed Nov. 30, 1976, and now-abandoned U.S. application Ser. No. 626,225 filed Oct. 28, 1975. U.S. application Ser. No. 936,804 filed Aug. 25, 1978 now U.S. Pat. No. 4,182,693 is a continuation-in-part of now-abandoned U.S. application Ser. No. 746,188, filed Nov. 30, 1976.

BACKGROUND OF THE INVENTION

1. Field of the Invention

The present invention relates to novel hydrocarbon conversion catalysts, methods for their preparation and uses thereof in hydrocarbon conversion processes. More particularly, the present invention relates to a catalytic cracking catalyst suitable for the conversion of high metals content hydrocarbon feeds.

2. Description of the Prior Art

Conventional hydrocarbon conversion catalysts are known to become rapidly deactivated by contact with hydrocarbon feeds containing large amounts of metallic contaminants. Typical feeds utilized, for example, in catalytic cracking have been gas oils, even though conversion of heavy petroleum crude oils and residual oils would increase the yield of gasoline obtainable from a barrel of oil. The heavy crude oils and residual oils, such as bottoms from atmospheric or vacuum distillation of crude oil contain large amounts of material having atmospheric pressure boiling points above 1050° F.+ and contain relatively large amounts of metallic contaminants generally present as organometallic compounds, large amounts of nondistillable asphaltenes, i.e. pentane or heptane-insoluble material, large amounts of sulfur and nitrogen and a high Conradson carbon residue. The actual amounts of these materials will vary according to the source of the crude and cut point made during the crude distillation. Tar sand oils, shale oils and liquified retorted coal present similar processing difficulties. To facilitate the total refining of these heavy hydrocarbon oils, they may be subjected to a hydrogen refining process. Although the hydrogen refining step facilitates handling and further processing operations since it may remove some of the metals, sulfur, nitrogen and polar compounds, it does not significantly affect the asphaltenes and the Conradson carbon residue contents. Consequently, the hydrogen refined heavy crudes and residua still contain large amounts of materials which are normally deleterious to conventional cracking catalysts. The deposition of metals on the catalyst, principally nickel, vanadium and iron is particularly disadvantageous since these metals absorb on or near active catalytic sites and act as catalytic agents to produce hydrogen, methane and coke instead of the desired more valuable products such as gasoline and light olefins.

It has now been found that the deleterious effect of feed metal deposition on the hydrocarbon conversion catalyst can be minimized with a catalyst comprising as one component an adsorbent having specified surface area and pore volume distribution composited with an inorganic oxide gel as second component. The catalyst also contains a crystalline aluminosilicate zeolite component.

Hydrocarbon conversion catalysts comprising a zeolite dispersed in a siliceous matrix are known, see, for example, U.S. Pat. No. 3,140,249 and U.S. Pat. No. 3,352,796. Cracking catalysts containing a zeolite, silica-alumina and clay are also known, see, for example, U.S. Pat. No. 3,449,265. Hydrocarbon conversion catalysts comprising a physical mixture of silica-alumina and a crystalline aluminosilicate zeolite in a siliceous matrix are also known, see, for example, U.S. Pat. No. 3,558,476. Processes for preparing hydrocarbon conversion catalysts containing a zeolite, clay, and silica or silica alumina are disclosed in U.S. Pat. Nos. 3,867,308 and 3,867,310.

SUMMARY OF THE INVENTION

In accordance with the invention there is provided a process for the conversion of a hydrocarbon oil which comprises: contacting said oil at hydrocarbon conversion conditions with a catalyst comprising (1) a crystalline aluminosilicate zeolite, (2) a catalytic inorganic oxide gel, and (3) a porous inorganic oxide having a surface area greater than about 200 square meters per gram and having at least 0.2 cubic centimeter per gram of its pore volume in pores ranging in diameter from about 90 to about 200 angstroms, said catalyst having at least 0.4 cubic centimeter per gram of its pore volume in pores greater than 90 angstroms in diameter.

In accordance with the invention there is further provided the novel hydrocarbon conversion catalyst utilized in the above-stated process and a process for preparing the catalyst which comprises: (a) blending a slurry of an inorganic oxide hydrogel with a slurry of a porous inorganic oxide; (b) removing at least a portion of the liquid from the resulting mixture; (c) drying the mixture resulting from step (b) to produce dried solids; (d) washing the dried solids resulting from step (c) with a washing medium; (e) separating the washed solids from said washing medium; (f) drying the separated solids resulting from step (e) to a moisture content ranging from about 8 to about 15 weight percent, and (g) recovering the catalyst of the present invention therefrom.

DESCRIPTION OF THE PREFERRED EMBODIMENT

In general, the catalyst composition of the present invention will comprise a crystalline aluminosilicate zeolite, an inorganic oxide gel and a porous inorganic oxide.

Zeolite Component

The crystalline aluminosilicate zeolite may be chosen from any of the known crystalline synthetic or naturally occurring zeolites. Examples of these zeolites include the zeolites designated by the Linde Division of Union Carbide Corporation by the letters X, Y, A, L (these zeolites are described in U.S. Pat. Nos. 2,882,244; 3,130,007; 2,882,243 and Belgian Pat. No. 575,117, respectively), ZSM type zeolites, such as ZSM-5 zeolite described in U.S. Pat. No. 3,702,866 and in *Nature*, vol. 272, Mar. 30, 1978, pp. 437–438, as well as the naturally occurring crystalline zeolites such as faujasite, chabazite, erionite, mordenite, offretite, gmelinite, analcite, etc. The zeolite, as produced or found in nature normally contains an alkali metal such as sodium and/or potassium and/or an alkaline earth metal such as calcium and magnesium. The zeolites differ from each other in structure, composition and particularly in the ratio of silica to alumina contained in the crystal lattice structure. For use in hydrocarbon conversion processes, the higher silica to alumina ratios among isostructural zeolites are preferred because of their higher stability at elevated temperature, particularly in the presence of steam. Therefore, whereas the zeolite component of the present invention may be any of the above-stated zeolites, the zeolites having silica to alumina ratios above 3 will be preferred. This includes natural and synthetic faujasite and mordenite. Typical among these zeolites is the synthetic faujasite variety wherein the silica to alumina ratio is about 2.3 to 7, preferably 3 to 6, more preferably 4.5 to 5.5. A high silica to alumina ratio zeolite is zeolite Y. Type X zeolite wherein the silica to alumina ratio is less than 3, e.g. 2.5 may also be used to advantage, although the most preferred zeolite components for use in the catalyst of the present invention will be those having a silica to alumina ratio greater than 3. The crystalline zeolites have uniform pore openings ranging in diameter from 3 to 15 angstroms. The preferred pore size catalyst for use as a zeolite component in the present invention will be zeolites having uniform pore size diameter ranging from about 6 to about 15 angstroms. For use as a hydrocarbon conversion catalyst component, it is usually necessary to reduce the alkali metal content of the crystalline aluminosilicate zeolite to a content of less than 10 weight percent, preferably less than 6 weight percent, and more preferably less than about 1 weight percent since the alkali metal components are normally undesirable catalytic components for the desired hydrocarbon conversion reactions. The alkali metal content reduction may be accomplished as is well known in the art by exchange with any one or more of the cations selected from Group IB through Group VIII metals of the Periodic Table of Elements (the Periodic Table referred to herein is given in the *Handbook of Chemistry and Physics*, published by the Chemical Rubber Publishing Company, Cleveland, Ohio, 45th Edition, 1964), as well as hydrogen cation or precursors (i.e. $NH_4^+$) capable of conversion to hydrogen cation. The preferred cations are those selected from the group consisting of rare earth metals, calcium, magnesium and hydrogen or mixtures thereof.

Suitable amounts of the zeolite component will range from about 1 to 40, preferably from about 5 to 40, more preferably from about 8 to 35 weight percent based on the total catalyst.

Inorganic Oxide Gel Component

Inorganic oxide gel suitable as component of the catalyst of the present invention are amorphous catalytic inorganic oxides such as silica, alumina, silica-alumina, silica-zirconia, silica-magnesia, alumina-boria, alumina-titania, and the like, and mixtures thereof. Preferably the inorganic oxide gel is a silica-containing gel, more preferably the inorganic oxide gel is an amorphous silica-alumina component such as a conventional silica-alumina cracking catalyst, several types and compositions of which are commercially available. These materials are generally prepared as a cogel of silica and alumina or as alumina precipitated on a pre-formed and pre-aged hydrogel. In general, silica is present as the major component in the catalytic solids present in such gels, being present in amounts ranging between about 55 and 100 weight percent, preferably the silica will be present in amounts ranging from about 70 to about 90 weight percent. Particularly preferred are two cogels, one comprising about 75 weight percent silica and 25 weight percent alumina and the other comprising about 87 weight percent silica and 13 weight percent alumina. The inorganic oxide gel component may suitably be present in the catalyst of the present invention in an amount ranging from about 45 to about 98 weight percent, preferably from about 45 to about 90 weight percent, more preferably from about 45 to about 82 weight percent based on the total catalyst.

The Porous Inorganic Oxide

The porous inorganic oxide may suitably be present in the total catalyst in amounts ranging from about 1 to about 55, preferably from about 5 to 45, more preferably from about 10 to 30 weight percent based on the total catalyst. The porous inorganic oxide may be chosen from a wide variety of inorganic oxides having the required physical characteristics. Preferably the porous inorganic oxide is a material having initially in itself prior to being composited less catalytic activity than the inorganic oxide gel component of the catalyst. It may also be chosen from porous inorganic oxides which have substantially no catalytic activity for conversion prior to being composited with the other components. Preferably, the porous inorganic oxide will be a bulk material. The term "bulk" with reference to the porous inorganic oxide is intended herein to designate a material which has been preformed and placed in a physical form such that its surface area and pore structure is stabilized so that when it is added to an impure inorganic gel containing considerable amounts of residual soluble salts, the salts will not alter the surface and pore characteristics measurably nor will they promote chemical attack on the preformed porous inorganic oxide which could then undergo change. For example, addition of "bulk" alumina will mean a material which has been formed by suitable chemical reaction, the slurry aged, filtered, dried, washed free of residual salts and then heated to reduce its volatile contents to less than about 15 weight percent. The resulting porous inorganic oxide is suitable for use as the porous component of the present invention. Suitable materials for use as porous inorganic oxide in the catalyst of the present invention include alumina, titania, silica, zirconia, magnesia and mixtures thereof. Preferably the porous inorganic oxide is a bulk alumina. Any type of alumina is suitable provided that it has the physical characteristics required by the present invention.

The porous inorganic oxide initially used as component in the catalyst of the present invention, after heating at 1000° F. in air for six hours, will have a surface area of at least about 200 $m^2/g$. The porous inorganic oxide must have at least 0.2 cubic centimeter per gram of its pore volume in pores having diameters ranging from about 90 to about 200 angstroms. It should be noted that the above-stated physical characteristics of the porous inorganic oxide are those of the porous inorganic oxide prior to being composited with the other components. The finished total catalyst of the present invention will have a pore size distribution such that when the pore volume is measured after subjecting the finished catalyst to steam treatment at 1400° F., 0 psig, for 16 hours, it will have at least 0.4 cubic centimeter per gram of its pore volume in pores having diameters greater than 90 angstroms. The pore volume referred to herein is determined by nitrogen adsorption (BET method).

The catalysts of the present invention may be prepared by any one of several methods. A preferred method of preparing one of the catalysts of the present invention, that is, a catalyst comprising silica-alumina and porous alumina, is to react sodium silicate with a solution of aluminum sulfate to form a silica/alumina hydrogel slurry which is then aged to give the desired pore properties, filtered to remove a considerable amount of the extraneous and undesired sodium and sulfate ions and then reslurried in water. Separately, a bulk alumina is made, for example, by reacting solutions of sodium aluminate and aluminum sulfate, under suitable conditions, aging the slurry to give the desired pore properties of the alumina, filtering, drying, reslurrying in water to remove sodium and sulfate ions and drying to reduce volatile matter content to less than 15 weight percent. The alumina is then slurried in water and blended, in proper amount, with the slurry of impure silica/alumina hydrogel.

The zeolite component is added to this blend. A sufficient amount of each component is utilized to give the desired final composition. The resulting mixture is then filtered to remove a portion of the remaining extraneous soluble salts therefrom. The filtered mixture is then dried to produce dried solids. The dried solids are subsequently reslurried in water and washed substantially free of the undesired soluble salts. The catalyst is then dried to a residual water content of less than about 15 weight percent. The catalyst is recovered after calcination for 6 hours at 1000° F. in air. When this catalyst is tested after subjecting it to steam treatment for 16 hours at 0 psig and 1400° F., it will have at least 0.4 cc/g of its pore volume in pores having diameters greater than 90 angstroms to be suitable as catalyst of the present invention.

The catalyst of the present invention is suitable for hydrocarbon conversion processes such as catalytic cracking, hydrocracking, isomerization, alkylation, and other carbonium ion catalyzed reaction types.

It is particularly suited for use in catalytic cracking processes and it is especially suited for catalytic cracking of high boiling point hydrocarbonaceous feeds having high metals content, a high Conradson carbon residue, high sulfur content, high nitrogen and other polar molecules.

Catalytic cracking with a catalyst of the present invention can be conducted in any conventional catalytic cracking manner. Suitable catalytic cracking conditions include a temperature from about 700° F. to about 1200° F. and a pressure ranging from about subatmospheric to several hundreds of atmospheres, typically from about atmospheric to 100 psig.

The process may be carried out in a fixed bed, moving bed, ebullient bed, slurry, transferline or a fluidized bed operation.

Although the catalysts of the present invention can be used to convert any of the conventional hydrocarbon feeds used in a given process (that is, it can be used to crack heavy naphthas and gas oils), they are especially suitable for feeds containing a high content of metal contaminants. By way of example, the catalyst of the present invention can be used to convert heavy crude oils, and residual oils such as petroleum atmospheric or vacuum distillation tower bottoms. The residual oils may contain 95 to 99 weight percent or more of the nickel and vanadium content of the crude oil feed. For example, the total metals content of such oils may range up to 2,000 weight ppm or more and the sulfur content may range up to 8 weight percent or more. The API gravity of such feeds may range from about 5° API to about 35° API and the Conradson carbon residue of the heavy feeds will generally range from about 5 to about 50 weight percent (as to Conradson carbon residue, see ASTM test D-189-65) although the catalyst can be used to convert lower Conradson carbon feeds.

The following examples are presented to illustrate the invention.

EXAMPLE 1

Comparative catalytic cracking experiments were performed utilizing a hydrotreated Cold Lake Whole Crude oil feed, at the following conditions: 950° F., 0 psig for 2 minutes at a space velocity of 15 W/Hr/W to determine the conversion to 430° F. minus boiling materials. The properties of the feed include: 19.4° API gravity; 0.406% sulfur; 0.151% nitrogen; 5.22% Conradson carbon; 2.5% asphaltenes; 4.9 ppm nickel and 7.2 ppm vanadium. Distillation of the feed showed only 70.7% boiling below 1050° F. at atmospheric pressure. The results are summarized in Table I.

The preparations and compositions of catalysts A through K are summarized in Table II.

As can be seen from Table I, the catalysts of the present invention, that is, catalyst A to D′, in which the inert adsorbent used had at least 0.2 cc/g of its pore volume in pores having diameters ranging from about 90 to 200 angstroms and wherein the steamed finished catalyst had at least 0.4 cc/g of its pore volume in pores greater than 90 angstroms, showed superior conversion results relative to the other catalysts tested that did not have the required physical characteristics.

TABLE I

| Catalyst | Wt. % Adsorbent | Surface Prop. of Adsorbent | | % RE-Y | Steamed[1] Catalyst PV (>90 A dia), cc/g | Conv., wt. % (15 W/Hr/W) |
| | | Surface Area, m²/g | Pore Vol. in 90-200 A Diameter Pores, cc/g | | | |
| --- | --- | --- | --- | --- | --- | --- |
| A | 29 | 393 | 1.09 | 11 | 0.773 | 76.2 |
| B | 44 | 393 | 1.09 | 11 | 0.610 | 73.7 |
| C | 30 | 393 | 1.09 | 11 | 0.692 | 72.9 |
| D | 29 | 393 | 1.09 | 11 | 0.577 | 70.4 |

TABLE I-continued

| Catalyst | Wt. % Adsorbent | Surface Area, m²/g | Pore Vol. in 90-200 A Diameter Pores, cc/g | % RE-Y | Steamed[1] Catalyst PV (>90 A dia), cc/g | Conv., wt. % (15 W/Hr/W) |
|---|---|---|---|---|---|---|
| D' | 29 | 523 | 0.21 | 11 | 0.760 | 69.2 |
| E | 28 | 309 | 0.024 | 11 | 0.365 | 59.6 |
| F | 30 | 328 | 0.16 | 12 | 0.352 | 66.7 |
| G | 29 | 528 | 0.18 | 11 | 0.910 | 62.6 |
| H | None | — | — | 8.5 | 0.430 | 57.8 |
| I | 40 | ~13 | 0.01 | 16 | 0.258 | 55.7 |
| J | 29 | 85 | 0.09 | 11 | 0.397 | 57.5 |
| K | 29 | 14 | 0.01 | 11 | 0.524 | 63.8 |

[1]Steamed 16 hours at 1400° F. and 0 psig

TABLE II

| Catalyst | Catalyst Preparation Details |
|---|---|
| A | Sodium silicate solution gelled by adding aluminum sulfate solution. Aged 1 hour at 90° F. pH adjusted to 5.2. Filtered. Reslurried and blended with Conoco HP grade alumina and calcined rare earth exchanged faujasite (Y-type). Spray dried. Washed. Dried. Composition: 11% Faujasite/29% HP grade alumina/60% (85% SiO₂/15% Al₂O₃) Gel. |
| B | Made the same as A. Composition: 11% Faujasite/44% HP grade alumina/45% (85% SiO₂/15% Al₂O₃) Gel. |
| C | Sodium silicate solution gelled by adding dilute H₂SO₄ to pH 10.5. Then add sodium aluminate solution to pH 12.0. Age 1 hour at 115° F. Then add aluminum sulfate solution to pH 4.3. Adjust pH to 6.8. Filter. Reslurried and blended with Conoco HP grade alumina and calcined rare earth exchanged faujasite (Y-type). Spray dried. Washed. Dried. Composition: 11% Faujasite/30% HP grade alumina/59% (75% SiO₂/25% Al₂O₃) Gel. |
| D | Sodium silicate solution gelled with dilute H₂SO₄ to pH 8. Aged 110 minutes at 110° F. Aluminum sulfate solution added. pH brought to 5.2. Filtered. Reslurried and blended with Conoco HP grade alumina and calcined rare earth exchanged faujasite (Y-type). Spray dried. Washed. Dried. Composition: 11% Faujasite/29% HP grade alumina/60% (85% SiO₂/15% Al₂O₃) Gel. |
| D' | Sodium silicate solution gelled with CO₂ at pH 10.5. Aged 30 minutes at 98° F. Aluminum sulfate solution added to bring pH to 5.0. Filtered. Reslurried and blended with Ketjen commercial alumina and calcined rare earth exchanged faujasite (Y-type). Spray dried. Washed. Dried. Composition: 11% Faujasite/29% Ketjen alumina/60% (87% SiO₂/13% Al₂O₃) Gel. |
| E | Sodium silicate solution gelled with dilute H₂SO₄ at pH 8.4. Aged 1 hour at 110° F. Aluminum sulfate solution added and pH adjusted to 5.0. Filtered. Reslurried and blended with a separate slurry of hydrous alumina (previously made by reacting solutions of sodium aluminate and aluminum sulfate) and calcined rare earth exchanged faujasite (Y-type). Spray dried. Washed. Dried. Composition: 11% faujasite/29% alumina/60% (85% SiO₂/15% Al₂O₃) Gel. |
| F | Sodium silicate solution gelled with CO₂ at pH 10.5. Aged 30 minutes at 98° F. Aluminum sulfate solution added to bring pH to 5.0. Filtered. Reslurried and blended with Conoco SB grade alumina and calcined rare earth exchanged faujasite (Y-type). Spray dried. Washed. Dried. Composition: 12% faujasite/30% SB grade alumina/58% (87% SiO₂/13% Al₂O₃) Gel. |
| G | Sodium silicate solution gelled by adding aluminum sulfate to pH 9.0. Aged 1 hour at 90° F. Then added more alum solution to pH 3.7. Adjusted pH to 5.0 with NH₄OH. Filtered. Reslurried and blended with Nalco commercial alumina and calcined rare earth exchanged faujasite (Y-type). Spray dried. Washed. Dried. Composition: 11% faujasite/29% Nalco alumina/60% (85% SiO₂/15% Al₂O₃) Gel. |
| H | Sodium silicate solution gelled by adding CO₂ to pH 10.5. Aged 30 minutes at 98° F. Aluminum sulfate solution added to bring pH to 5.0 and then calcined rare earth exchanged faujasite (Y-type) blended therein. Filtered. Reslurried. Spray dried. Washed. Dried. Composition: 8.5% faujasite/91.5% (87% SiO₂/13% Al₂O₃) Gel. |
| I | This catalyst is a commercial cracking catalyst. It is believed to contain about 16% rare earth faujasite (Y-type), about 40-45% kaolin, and about 40-45% silica/alumina gel. |
| J | Sodium silicate solution gelled with dilute H₂SO₄ to pH 8.3. Aged 1 hour at 112° F. Aluminum sulfate added to pH 3.9. pH adjusted to 5.2 with NH₄OH. Filtered. Reslurried and blended with Florex (attapulgite clay from Floridin Co.) and calcined rare earth exchanged faujasite. Spray dried. Washed. Dried. Composition: 11% faujasite/29% attapulgite/60% (85% SiO₂/15% Al₂O₃) Gel. |
| K | Sodium silicate solution gelled with aluminum sulfate at pH 10.2. Aged 1 hour at 90° F. Additional alum added to bring pH to 4.5. Adjusted pH to 5.15 with NH₄OH. Filtered. Reslurried and blended with kaolin (hydrafine SD grade from J. Huber Corp.) and calcined rare earth exchanged faujasite (Y-type). Spray dried. Washed. Dried. Composition: 11% faujasite/29% kaolin/60% (85% SiO₂/15% Al₂O₃) Gel. |

EXAMPLE 2

A catalyst of the invention was made as follows: sodium silicate solution was gelled with CO₂ at pH 10.5. After aging at 98° F. for 30 minutes, aluminum sulfate was added to bring the pH to 5.0. After filtering, the slurry was blended with Conoco HP grade alumina and calcined rare earth exchanged faujasite, spray dried, washed and calcined 16 hours at 1000° F. in air. This catalyst, designated "M", comprised 11% faujasite, 20% HP grade alumina, and 69% (75% SiO₂/25% Al₂O₃) gel.

Catalyst M (Table III), and catalyst I of Table II were each steamed 16 hours at 1400° F. and 0 psig and charged to a cyclic fluid bed unit operating at 950° F. reactor temperature and about 1250° F. regenerator temperature. The feed was a Santa Barbara 650° F.+ atmospheric residua having 13.5° API gravity, 1.68 wt. % sulfur, 0.26 wt. % basic nitrogen, 10.34% Conradson carbon, 103.1 ppm nickel, and 116.5 ppm vanadium. The metals deposited on each catalyst were allowed to build up to 3000 ppm equivalent Ni (ppm Ni+0.2 ppm V). At this metals level, the cracking performances of the two catalysts were compared. This is shown in Table III, listing the activity, carbon yield, and H₂ production of catalyst M relative to catalyst I of Table II:

TABLE III

| Catalyst | I | M |
|---|---|---|
| Relative Activity | 1.00 | 2.04 |
| Relative Carbon | 1.00 | 0.33 |
| Relative $H_2$ | 1.00 | 0.78 |

The data of Table III show the superior performance of catalyst M, which is a catalyst in accordance with the present invention. Not only is the activity of catalyst M, which comprised only about 11% faujasite, about double the activity of conventional commercial catalyst I, which comprised about 16% faujasite, but catalyst M was less responsive to the adverse effects of nickel and vanadium, as shown by the much lower carbon and hydrogen yields.

EXAMPLE 3

A catalyst of the invention was made as follows: Sodium silicate solution was gelled with $CO_2$ at pH 10.5. After aging at 98° F. for 30 minutes, aluminum sulfate was added to bring the pH to 5.0. After filtering, the slurry was blended with a slurry of Conoco HP alumina and Nafaujasite (Linde SK-30 grade). The combined slurry was colloid milled, spray dried, and washed to remove extraneous soluble salts. The filter cake was reslurried in hot $H_2O$ (130° F.) and rare earth chloride solution added and stirred for 30 minutes. The slurry was filtered, rinsed, and dried. The catalyst comprises about 16% faujasite/29% HP alumina/55% silica-alumina gel. Rare earth content of the total catalyst is 2.7 weight percent as $RE_2O_3$. This catalyst is designated herein catalyst "N".

EXAMPLE 4

Another catalyst of the invention was made using the same procedure as in Example 3. After washing the catalyst it was reslurried in dilute rare earth chloride solution at 130° F. for 30 minutes, filtered, rinsed with $H_2O$ and dried. This catalyst, designated "P" comprises about 25% faujasite/29% HP alumina/46% silica-alumina gel. Rare earth content of the total catalyst is 4.2 weight percent as $RE_2O_3$.

EXAMPLE 5

The catalyst of this example is also a catalyst of the invention. It was made by the same procedure as outlined in Example 3. After washing, the wet filter cake was reslurried in a dilute rare earth chloride solution at 130° F. for 30 minutes, filtered, rinsed with $H_2O$, and dried. This catalyst, designated "Q" comprises about 35% faujasite/25% HP alumina/40% silica-alumina gel. Rare earth content of the total catalyst is 5.4 weight percent as $RE_2O_3$.

EXAMPLE 6

Catalyst I, which is the catalyst of reference, and catalysts N, P and Q were steamed at 1400° F. for 16 hours and 0 psig. Comparative cracking experiments were performed utilizing a hydrotreated Cold Lake Whole Crude oil feed at 950° F. over a 2 minute process period. The oil feed is described in Example 1. In Table IV, the catalysts are compared at a common 75% conversion level to 430° F.— products.

TABLE IV

| Catalyst | I | N | P | Q |
|---|---|---|---|---|
| % Faujasite | 16–19 | 16 | 25 | 35 |
| % Porous Inorganic Oxide | ~40 (Kaolin) | 29 $Al_2O_3$ | 29 $Al_2O_3$ | 25 $Al_2O_3$ |
| At 75% Conversion: | | | | |
| W/Hr/W | 7.3 | 9.5 | 13.1 | 17.0 |
| Carbon, % | 9.9 | 8.0 | 7.6 | 8.0 |
| $C_5$/430° F., wt. % | 55.2 | 57.3 | 58.3 | 56.0 |
| 430/650° F., wt. % | 19.0 | 20.1 | 19.3 | 19.2 |

The data show that catalyst N at the same approximate faujasite content as catalyst I showed higher activity and improved product distribution. Increasing the zeolite content of the catalyst to 25 and 35 percent as in catalysts P and Q served principally to increase activity without adverse effects on product distribution.

What is claimed is:

1. A process for the conversion of a hydrocarbon oil which comprises: contacting said oil at hydrocarbon conversion conditions with a catalyst comprising (1) a crystalline aluminosilicate zeolite, said zeolite being present in an amount ranging from about 1 to about 40 weight percent based on the total catalyst, (2) a catalytic inorganic oxide gel, said gel being present in an amount ranging from about 45 to about 98 weight percent, and (3) a porous inorganic oxide initially having a surface area greater than about 200 square meters per gram and having at least 0.2 cubic centimeter per gram of its pore volume in pores ranging in diameter from about 90 to about 200 angstroms, said porous inorganic oxide in itself having less catalytic activity than said inorganic oxide gel component, said porous inorganic oxide being present in an amount ranging from about 1 to about 55 weight percent based on the total catalyst, and said catalyst having at least 0.4 cubic centimeter per gram of its pore volume in pores greater than 90 angstroms in diameter.

2. The process of claim 1 wherein said porous inorganic oxide is selected from the group consisting of alumina, silica, titania, zirconia, magnesia and mixtures thereof.

3. The process of claim 1 wherein said porous inorganic oxide is alumina.

4. The process of claim 1 wherein said porous inorganic oxide is silica.

5. The process of claim 1 wherein said porous inorganic oxide has been preformed and placed in physical form such that its surface area and pore structure are stabilized.

6. The process of claim 1 wherein said porous inorganic oxide comprises from about 5 to about 45 weight percent of the total catalyst.

7. The process of claim 1 wherein said hydrocarbon oil is a gas oil.

8. The process of claim 1 wherein said hydrocarbon oil is a metals-containing heavy oil.

9. The process of claim 1 wherein said inorganic oxide gel is a silica-containing gel.

10. The process of claim 1 wherein said inorganic oxide gel is a cogel of silica-alumina.

11. The process of claim 1 wherein said crystalline aluminosilicate zeolite has the structure of faujasite.

12. The process of claim 1 wherein said crystalline aluminosilicate zeolite has uniform pore diameters ranging from about 6 to about 15 angstroms and wherein the silica to alumina ratio is greater than 3.

13. The process of claim 1 wherein said zeolite comprises less than 10 weight percent alkali metal, calculated as the metal.

14. The process of claim 1 wherein said hydroconversion process is catalytic cracking.

15. The process of claim 1 wherein said hydrocarbon oil is a residual petroleum oil.

16. A process for catalytic cracking of a hydrocarbon oil which comprises: contacting said oil at catalytic cracking conditions with a catalyst comprising (1) a crystalline aluminosilicate zeolite, said zeolite being present in an amount ranging from about 1 to about 40 weight percent, based on the total catalyst, (2) a silica-alumina gel, said gel being present in an amount ranging from about 45 to about 98 weight percent, based on the total catalyst, and (3) alumina initially having a surface area greater than about 200 square meters per gram and having at least 0.2 cubic centimeter per gram of its pore volume in pores ranging in diameter from about 90 to about 200 angstroms, said alumina being present in an amount ranging from about 1 to about 55 weight percent, based on the total catalyst, and said catalyst having at least 0.4 cubic centimeter per gram of its pore volume in pores greater than 90 angstroms in diameter.

17. The process of claim 16 wherein said zeolite comprises cations selected from the group consisting of rare earth metals, calcium, magnesium, hydrogen and mixtures thereof.

18. The process of claim 16 or claim 17 wherein said crystalline aluminosilicate zeolite has the structure of faujasite.

19. The process of claim 16 or claim 17 wherein said crystalline aluminosilicate zeolite has uniform pore diameters ranging from about 6 to about 15 angstroms and wherein the silica to alumina ratio of said zeolite is greater than 3.

20. A process for the conversion of a hydrocarbon oil which comprises: contacting said oil at hydrocarbon conversion conditions with a catalyst consisting essentially of (1) a crystalline aluminosilicate zeolite, said zeolite comprising cations selected from the group consisting of rare earth metals, calcium, magnesium, hydrogen and mixtures thereof, said zeolite being present in an amount ranging from about 1 to about 40 weight percent of the total catalyst, (2) a silica-alumina gel, said gel being present in an amount ranging from about 45 to about 98 weight percent based on the total catalyst, and (3) alumina initially having a surface area greater than about 200 square meters per gram and having at least 0.2 cubic centimeter per gram of its pore volume in pores ranging in diameter from about 90 to about 200 angstroms, said alumina being present in an amount ranging from about 1 to about 55 weight percent, based on the total catalyst, and said catalyst having at least 0.4 cubic centimeter per gram of its pore volume in pores greater than 90 angstroms in diameter.

* * * * *